Aug. 31, 1937. P. SCHUFTAN 2,091,493
PROCESS OF SEPARATING A SOLUTION INTO ITS CONSTITUENT PARTS
Filed May 13, 1936
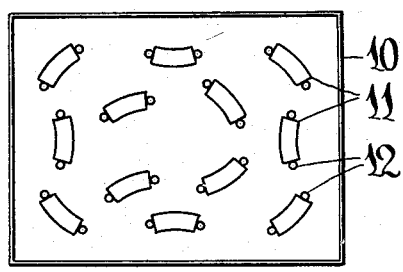
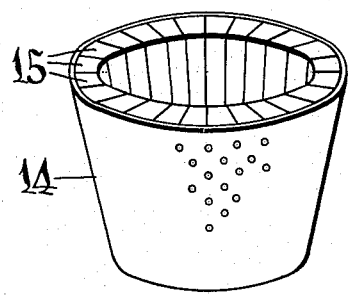
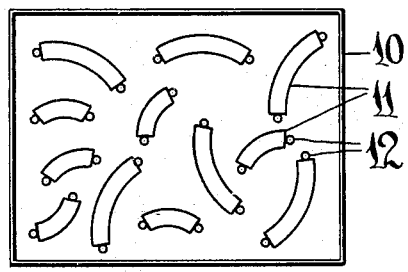
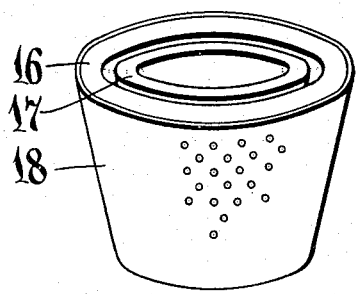
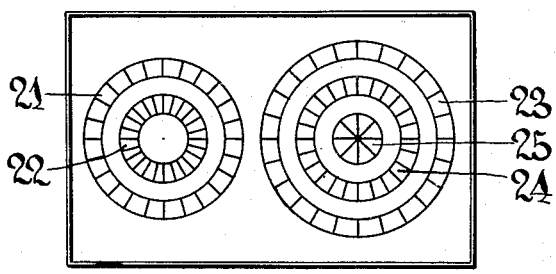
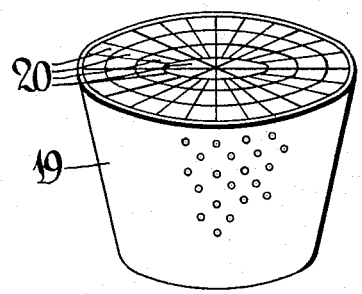
INVENTOR:
Paul Schuftan,
By Potter, Pierce + Scheffler,
ATTORNEYS.

Patented Aug. 31, 1937

2,091,493

UNITED STATES PATENT OFFICE 2,091,493

PROCESS OF SEPARATING A SOLUTION INTO ITS CONSTITUENT PARTS

Paul Schuftan, Hollriegelskreuth, near Munich, Germany

Application May 13, 1936, Serial No. 79,564
In Germany June 8, 1935

4 Claims. (Cl. 62—124)

In an application Serial No. 749,666, filed Oct. 23, 1934, now matured into Patent No. 2,057,598, issued Oct. 13, 1936, in the name of Paul Schuftan, Ernst Karwat and Albrecht Steinbach, there is disclosed a process for the separation of the constituents of a solution involving freezing the solution into a structurally stable body and then, without alteration of the form of the body, subjecting it to treatment, e. g. in a centrifuge, to separate the solid from the liquid components. For example, milk or fruit juice is frozen in an annular chamber, the outer diameter of which corresponds to that of the centrifuge basket and the resulting annular body is transferred to the centrifuge where the solid and liquid components are separated. It will be understood that in freezing the solution one component of it crystallizes into a porous mass and the other component remains in the liquid state in the interstices between the crystals. It will be understood further that the freezing is accomplished by applying the temperature gradient in the direction in which force is to be applied for separating the liquid and solid components so as to produce an orientation of crystals and interstices extending in said direction.

According to the present invention, instead of forming a unitary body of the solution by freezing and subjecting it individually to treatment for separation of its solid and liquid components, a plurality of bodies are produced from the solution which are then assembled into the desired shape for treatment for separation of the solid and liquid components. Thus, instead of forming a single ring shaped body and transferring it to a centrifuge, two or more segments of a ring shaped body may be formed and then assembled to an annular shape in the centrifuge.

This expedient possesses many advantages. For the treatment of a solution on a large scale it is desirable to treat large masses of it in a single operation, but according to the process of the application referred to above, this involves the production of annular frozen masses of small cross-section in order to favor heat exchange in the freezing operation and of large diameter in order to provide the desired capacity. A ring shaped freezing vessel of such small cross-section and large diameter encloses a large dead or wasted space so that only a small fraction of the brine tank used for cooling the freezing vessel is utilized. According to the present invention, by freezing the ice ring in pieces, such as segments, the brine tank can be completely utilized and the weight of the single bodies of frozen solution which must be transferred from the freezing apparatus to the centrifuge is greatly reduced.

According to the application above referred to, in freezing the solution, the temperature gradient is applied in the same direction through the body of the solution as the force applied for the separation of ice from concentrate. If, in the freezing of segments in accordance with the present invention, crystallization should tend to take place in other directions due, for instance, to the cooling of the side walls of the freezing chambers in which the segments are formed, such undesired crystallization may be avoided by the use of suitable heat insulation on said side walls.

Instead of freezing the ice ring which is to be treated in a centrifuge in the form of segments, as described above, I may freeze a plurality of ice rings of such relative sizes that they may be nested together, i. e. the inner diameter of a larger ring may be equal to the outer diameter of the next smaller ring. Thus thin walled rings which are essential in the freezing operation may be produced, the freezing vessels may be nested concentrically in the brine bath so as to fully utilize the latter, and the centrifuge may be more fully utilized than when treating a single thin walled ring by, in effect, charging it with a thick walled ring, i. e. a plurality of concentric thin walled rings.

The two expedients described above, i. e. the production of a ring shaped body in the form of segments and the production of concentric rings, may be combined, i. e. the individual concentric rings may be formed in segments and then assembled in the centrifuge for separation of the solid and liquid components.

The invention is illustrated in the accompanying drawing.

Fig. 1 illustrates in a plan view a plurality of freezing vessels, so shaped as to freeze the solution in the form of segments of a ring shaped body, assembled in the brine tank.

Fig. 2 illustrates in a plan view a plurality of freezing vessels, adapted to produce a plurality of concentric ice rings, assembled in the brine tank.

Fig. 3 illustrates in a plan view a plurality of freezing vessels, adapted to produce the necessary segments of a plurality of concentric rings, assembled in the brine tank.

Fig. 4 shows in perspective the basket of a centrifuge charged with a single ice ring formed of segments.

Fig. 5 shows in perspective the basket of a centrifuge charged with a plurality of concentric unitary ice rings, and Fig. 6 shows in perspective the basket of a centrifuge charged with a plurality of concentric ice rings each composed of segments.

It will be appreciated that the illustrations in the accompanying drawing are merely diagrammatic and that they are not intended to show the actual structure of the cooling vessels, the brine tank, or the centrifuge. For the sake of clearness, illustration of means for circulating the brine, etc., have been omitted.

Referring more particularly to the drawing, brine or freezing tanks 10 are adapted to contain immersed therein freezing vessels 11 formed in the shape of segments of a ring shaped body. The solution to be frozen is introduced into freezing vessels 11 and subjected to the freezing action of the brine until frozen. The vessels 11 may be withdrawn by use of handles 12, the solidified segments removed from the freezing vessels and inserted into the basket 14 of a centrifuge as shown in Fig. 4, the individual segments 15 of frozen solution being packed to form a ring.

Individual ring-like bodies 16 and 17 may be frozen and inserted concentrically in a centrifuge basket 18 as shown in Fig. 5 or a centrifuge basket 19, Fig. 6, may be packed with individual segments 20 of frozen solution, produced in freezing vessels, 21, 22, 23, 24 and 25 formed in segments and placed in a brine tank in concentric relation and brine solution circulated therearound.

I claim:—

1. In the process for the separation of a solution into its components by freezing the solution into a structurally stable mass comprising one component in solid phase and the other component in liquid phase and applying force to said mass without disintegration thereof to separate said phases, the steps which consist in freezing a plurality of separate portions of the solution into a plurality of bodies adapted to be assembled to form a mass of the desired shape, assembling said bodies to form said mass, and subjecting said mass to the force for the separation of the solid and liquid phases.

2. Process as defined in claim 1 in which the portions of the solution are frozen into bodies adapted to be assembled into a ring shaped mass, and said bodies are assembled in the basket of a centrifuge and subjected to centrifugal force to separate the solid and liquid components.

3. Process as defined in claim 1 in which the portions of the solution are frozen into a plurality of ring shaped bodies of such relative size as to be assembled concentrically and are assembled in the basket of a centrifuge and subjected to centrifugal force to separate the solid and liquid components.

4. Process as defined in claim 1 in which the portions of the solution are frozen into a plurality of bodies adapted to be assembled into a plurality of concentric ring shaped masses which are assembled in a centrifuge and subjected to centrifugal force to separate the solid and liquid components.

PAUL SCHUFTAN.